(12) United States Patent
Peters, II et al.

(10) Patent No.: US 8,717,421 B2
(45) Date of Patent: May 6, 2014

(54) SYSTEM AND METHOD FOR AUTOMATIC CALIBRATION OF STEREO IMAGES

(76) Inventors: Richard Alan Peters, II, Nashville, TN (US); Shawn Atkins, Nashville, TN (US); Dae Jin Kim, Nashville, TN (US); Aditya Nawab, Nashville, TN (US)

(*) Notice: Subject to any disclaimer, the term of this patent is extended or adjusted under 35 U.S.C. 154(b) by 701 days.

(21) Appl. No.: 12/838,885

(22) Filed: Jul. 19, 2010

(65) Prior Publication Data

US 2011/0063417 A1    Mar. 17, 2011

Related U.S. Application Data

(60) Provisional application No. 61/226,568, filed on Jul. 17, 2009.

(51) Int. Cl.
*H04N 15/00* (2006.01)
*H04N 13/02* (2006.01)

(52) U.S. Cl.
USPC .................................................. 348/47

(58) Field of Classification Search
USPC .................................................. 348/47
See application file for complete search history.

(56) References Cited

U.S. PATENT DOCUMENTS

| | | | |
|---|---|---|---|
| 4,490,617 A * | 12/1984 | Loose | 250/260 |
| 5,684,531 A * | 11/1997 | Li et al. | 348/139 |
| 5,767,980 A * | 6/1998 | Wang et al. | 358/475 |
| 6,101,455 A * | 8/2000 | Davis | 702/94 |
| 6,219,063 B1 * | 4/2001 | Bouguet et al. | 345/426 |
| 6,873,924 B1 * | 3/2005 | Welles et al. | 702/94 |
| 7,479,982 B2 * | 1/2009 | Otani et al. | 348/188 |
| 7,853,359 B2 * | 12/2010 | Ban et al. | 700/263 |
| 2002/0154269 A1 * | 10/2002 | Liu et al. | 351/206 |
| 2004/0066454 A1 * | 4/2004 | Otani et al. | 348/188 |
| 2004/0085453 A1 * | 5/2004 | Gladnick et al. | 348/207.99 |
| 2004/0233290 A1 * | 11/2004 | Ohashi et al. | 348/187 |
| 2005/0128196 A1 * | 6/2005 | Popescu et al. | 345/420 |
| 2005/0220363 A1 * | 10/2005 | Oldroyd | 382/294 |
| 2005/0270375 A1 * | 12/2005 | Poulin et al. | 348/187 |
| 2005/0280709 A1 * | 12/2005 | Katayama | 348/187 |
| 2008/0292131 A1 * | 11/2008 | Takemoto et al. | 382/100 |
| 2009/0116742 A1 * | 5/2009 | Nishihara | 382/173 |
| 2010/0329543 A1 * | 12/2010 | Li et al. | 382/154 |

* cited by examiner

*Primary Examiner* — Sath V Perungavoor
*Assistant Examiner* — Peter D Le
(74) *Attorney, Agent, or Firm* — W. Edward Ramage; Baker Donelson (57) ABSTRACT

A method and system to enable a computer to estimate calibration parameters autonomously so that accurate stereopsis can be performed. The present invention automatically calibrates two or more cameras with unknown parameters with respect to a robot or robotic appendage (e.g., articulated robot arm) with a light source that can be turned on and off at one end. A pair of cameras (e.g., digital cameras) are positioned and aimed so as to give stereoptic coverage of the robot's workspace. The procedure determines the positions and orientations of the pair of cameras with respect to a robot (i.e., exterior orientations) and the focal lengths, optical centers, and distortion coefficients of each camera (i.e., intrinsic parameters) automatically from a set of known positions of the robot arm, and a set of images from the right and left cameras of the robot arm in each position as the light is turned on and off.

14 Claims, 5 Drawing Sheets

SYSTEM AND METHOD FOR AUTOMATIC CALIBRATION OF STEREO IMAGES

This application claims benefit of and priority to U.S. Provisional Application No. 61/226,568, filed Jul. 17, 2009, and is entitled to that filing date for priority. The specification, figures and complete disclosure of U.S. Provisional Application No. 61/226,568 are incorporated herein by specific reference for all purposes.

FIELD OF INVENTION

This invention relates to a system and method for the automatic estimation of calibration parameters so that accurate stereopsis can be performed. More particularly, this invention relates to a system and method for the automatic calibration of a pair of cameras used for stereo robotic or computer vision.

BACKGROUND OF THE INVENTION

In the field of robotics, a robot or computer controlling a robot or robotic appendage often is equipped with a vision system of some sort to detect and recognize objects in the area. One common approach is to use two cameras to provide three-dimensional (3D) binocular stereo vision, and obtain positioning information of a 3D object. This approach is often used in industrial robotic applications.

However, the 3D stereo vision approach requires the measuring functions of the camera system to be properly set up and integrated with the application program. A critical factor is the proper calibration of the cameras, which is difficult when a variety of parameters are unknown. It is to this problem that the current invention is addressed.

SUMMARY OF INVENTION

In one exemplary embodiment, the present invention comprises a method and system to enable a computer to estimate calibration parameters autonomously so that accurate stereopsis can be performed. Stereopsis is the estimation of the relative 3D positions of objects given images of the objects in two or more cameras. More specifically, the present invention automatically calibrates two or more cameras with unknown parameters with respect to a robot or robotic appendage (e.g., articulated robot arm).

In one embodiment, a system in accordance with the present invention comprises an articulated robot arm, a light source (such as an LED) that can be turned on and off attached to one end of the arm, a pair of cameras (e.g., digital cameras) positioned and aimed so as to give stereoptic coverage of the robot's workspace (i.e., a contiguous region of 3D space, such that every point in the space can be reached by the end of the robot arm), and a computing device (e.g., personal computer, workstation, laptop, tablet, or the like) with which both the robot and cameras are in electronic communication (wireless, or wired, such as by USB or firewire ports), and from which the cameras and robot can be controlled. The procedure determines the positions and orientations of a pair of cameras with respect to a robot (i.e., exterior orientations) and the focal lengths, optical centers, and distortion coefficients of each camera (i.e., intrinsic parameters) automatically from a set of known positions of the robot arm, and a set of images from the right and left cameras of the robot arm in each position.

DETAILED DESCRIPTION OF EXEMPLARY EMBODIMENTS

In an exemplary embodiment, the present invention comprises a method and system to enable a computer to estimate calibration parameters autonomously so that accurate stereopsis can be performed. Stereopsis is the estimation of the relative 3D positions of objects given images of the objects in two or more cameras. More specifically, the present invention automatically calibrates two or more cameras with unknown parameters with respect to a robot or robotic appendage (e.g., articulated robot arm).

Figure 1:
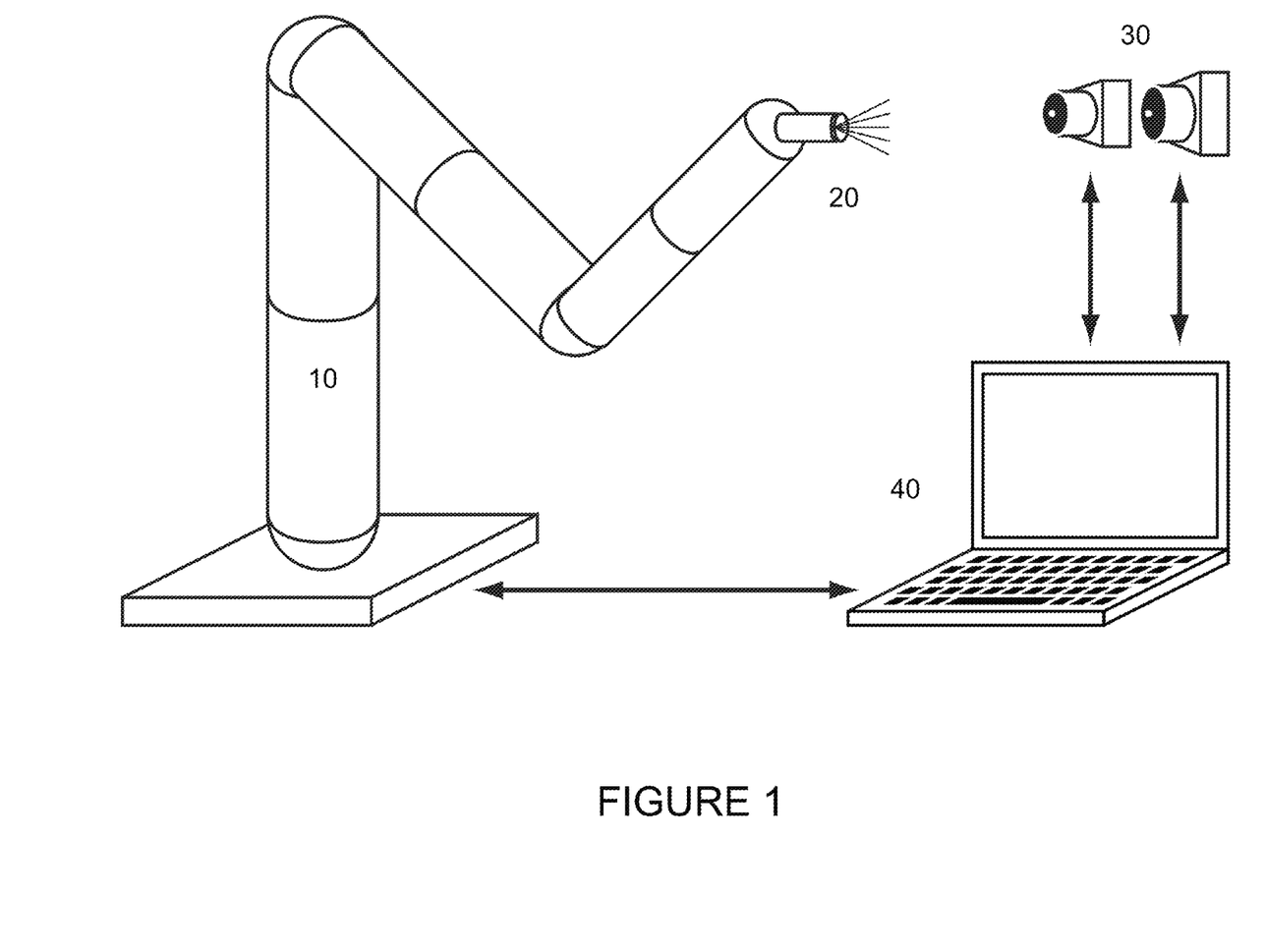
FIG. 1 shows an example of a system with a robot arm and dual cameras in accordance with an exemplary embodiment of the present invention.

FIG. 1 shows an example of a system with an articulated robot arm 10, a light source (such as an LED) 20 that can be turned on and off attached to one end of the arm, a pair of cameras (e.g., digital cameras) 30 positioned and aimed so as to give stereoptic coverage of the robot's workspace (i.e., a contiguous region of 3D space, such that every point in the space can be reached by the end of the robot arm), and a computing device 40 (e.g., personal computer, workstation, laptop, tablet, or the like) with which both the robot and cameras are in electronic communication (wireless, or wired, such as by USB or firewire ports), and from which the cameras and robot can be controlled. The procedure determines the positions and orientations of a pair of cameras with respect to a robot (i.e., exterior orientations) and the focal lengths, optical centers, and distortion coefficients of each camera (i.e., intrinsic parameters) automatically from a set of known positions of the robot arm, and a set of images from the right and left cameras of the robot arm in each position.

In general, the present invention implements an algorithm in computer software run by a processor or microprocessor in the computing device, operating on a sequence of digital image pairs captured from the two cameras in an uncalibrated stereo configuration. "Uncalibrated" refers to the state of neither the baseline nor the relative directions of the optical axes being known with precision. The baseline is the distance between the optical centers (i.e., focal points) of the cameras. The optical axis of a camera is the unique ray that is perpendicular to the sensor plane (i.e., focal plane), intersects the optical center, and continues into the scene in front of the camera. The optical axis defines the direction in which the camera is pointing.

In various exemplary embodiments, a typical scenario comprises a pair of cameras or webcams attached to a computer, a game console, a robot, or similar device. The cameras have been positioned manually to point in roughly the same direction. In one embodiment, the cameras are separated through a baseline less than 40 times the width of the physical sensors within them. For cameras with CCD sensor arrays, the CCD sensor array in consumer grade cameras varies from about 4 to 16 mm on a side. That implies maximum useful baselines on the order of 160 mm to 640 mm depending on the cameras. The present invention operates with little or no intrinsic camera information known.

Given a pair of images from an uncalibrated stereo camera set, the system computes rectification maps and the relative positions and orientations of the cameras. Rectification maps warp images so that they appear as they would on a perfectly calibrated stereo camera set. The depth information so provided is relative up to a scale factor, which is the theoretical limit of abilities for such a system. If the user, however, provides the distance to a reference point, or images an object of known size, the system can produce absolute depth information.

In one embodiment, the method comprises a Main Procedure with subsequent procedures for image normalization, rectification, and other processes. The Main Procedure comprises the following steps:

1. Determine the workspace of the robot.
2. Select $n \geq 20$ positions $\{p^W_i\}_{i=1,\ldots,n}$, where $p^W_i = (x^W, y^W, z^W)_i$, from the workspace systematically or at random, such that $\{p^W_i\}_{i=1,\ldots,n}$ fill the workspace with approximate uniformity.
3. For $i=1, \ldots, n$:
   a. Move the robot arm to the $i^{th}$ position $p^W_i = (x^W, y^W, z^W)_i$ with an orientation, $r^W_i = (\theta^W, \phi^W, \omega^W)_i$, that makes the light visible to both cameras (position and orientation of the robot are determined with respect to the coordinate system of the robot, here labeled W, for world coordinates).
   b. Send to the computer the 6D position and orientation, $(p^W, r^W)_i$, of the robot.
   c. If the light is off, turn it on.
   d. Take pictures from both cameras and transfer the pair of digital images to the computer.
   e. Turn the light off.
   f. Take pictures from both cameras and transfer the pair of digital images to the computer.
   g. Subtract the light-off images from the light-on images to get images of the light alone.
   h. Using digital image analysis techniques, find the (x, y) pixel positions of the light in both the left and the right images. Designate these $p_{L,i}=(x_L, y_L)_i$ and $p_{R,i}=(x_R, y_R)_i$, respectively.
   i. Associate the three positions as a triple $(p^W, p_L, p_R)_i$.
4. Using the set $\{(p^W, p_L, p_R)_i\}_{i=1,\ldots,n}$ determine the intrinsic and extrinsic camera parameters. The intrinsic parameters are $K_L$ and $K_R$, the left and right camera matrices and $\kappa_L$ and $\kappa_R$, the left and right radial distortion vectors. The extrinsic parameters are $R^W_L$ and $R^W_R$, the rotation matrices that rotate left and right camera coordinates into world coordinates, and $t^W_L$ and $t^W_R$, the positions of the optical centers of the left and right cameras in world coordinates. In terms of scalars, the intrinsic parameters for the left camera are:

$$K_L = \begin{bmatrix} f^L_x & \sigma^L & c^L_x \\ 0 & f^L_y & c^L_y \\ 0 & 0 & 1 \end{bmatrix} \text{ and } \kappa_L = \begin{bmatrix} \rho^L_1 \\ \rho^L_2 \\ \tau^L_1 \\ \tau^L_2 \end{bmatrix}, \quad (1)$$

where $f^L_x$ and $f^L_y$ are the x- and y-components of the focal length, $(c^L_x, c^L_y)$ is the optical center of the image, $\sigma^L$ is the skewing factor, $\rho^L_1$ and $\rho^L_2$ are the $2^{nd}$ order and $4^{th}$ order radial distortion coefficients, and $\tau^L_1$ and $\tau^L_2$ are the $2^{nd}$ order and $4^{th}$ order tangential distortion coefficients. The right camera's parameters are of similar form, but almost always of different values.

The parameters are determined by finding those that minimize the geometric difference between the world points, $\{p^W_i\}_{i=1,\ldots,n}$ and the stereo projections of the image pixel locations, $\{(p_L, p_R)_i\}_{i=1,\ldots,n}$ over all the extrinsic and intrinsic parameters simultaneously. The choice of representation of the parameters is crucial to the accuracy of the optimization. This representation and the algorithm itself are described in detail below.

Parameter Optimization.

In one exemplary embodiment, parameter optimization comprises ten parts or steps, as described in overview below. Note that all camera-related operations are described herein in terms of the left camera, but are performed on both the left and right cameras. Each of these steps is described in more detail below.

A. The point triples are homogenized and normalized.

B. A first estimate is made of the individual camera parameters by finding those parameters that minimize the geometric distance between the image pixel locations, $\{(p_L, p_R)_i\}_{i=1,\ldots,n}$, and the forward projected world points $\{p^W_i\}_{i=1,\ldots,n}$. This secondary parameter optimization is also described in detail below. The forward projections are given in terms of both intrinsic and extrinsic parameters, as $$p_{L,i} = P^L_W\{p^W_i\} = K_L \Phi\{[R^L_W | t^L_W] p^W_i; \kappa_L\} \quad (2)$$

where $[R^L_W | t^L_W] P^W_i$ represents a perfect pinhole projection of the world point and $\Phi\{\bullet; \bullet\}$ is the radial distortion operator.

C. The resulting projection transforms are normalized.

D. The normalized transforms are decomposed in to their constituents, $K_L$, $R^L_W$, and $t^L_W$.

E. From the latter two, the inverses, $R^W_L$, and $t^W_L$ are computed.

F. Rotation matrix $R^W_L$ is converted to a 3-element rotation vector, $r^W_L$ through a Rodrigues transform.

G. A vector of 32 parameters, $\beta$, is constructed such that the first 16 are $$\beta_1 = f^L_x, \beta_2 = \sigma, \beta_3 c^L_x, \beta_4 = f^L_y, \beta_5 = c^L_y,$$

$$\beta_6 = 1 \beta_{7-9} = r^W_L, \beta_{10-12} = t^W_L, \beta_{13-16} = \kappa_L, \quad (3)$$

and the second 16 are similar but for the right camera.

H. A Levenberg-Marquardt optimization routine is run to minimize the geometric difference between the normalized world points and the stereo projections of the normalized undistorted image pixel locations subject to the soft constraints that $f^L_x = f^L_y$, $f^R_x = f^R_y$, $\sigma^L = 0$, $\sigma^R = 0$, $\beta_6 = 1$, and $\beta_{22} = 1$. Soft constraints means that the constraints are set up as minimization criteria and allowed to approach their ideal values and not forced to have them. Soft constraints yield better results than strict constraints in this procedure.

I. The left and right projection matrices are reconstructed and the left and right distortion coefficients are retrieved.

J. The projection matrices are decomposed into their constituent matrices and vectors.

A. Homogenization and Normalization.

For homogenization: the world points and image points are increased in dimension by 1 as $$p_{L,i} = \begin{bmatrix} x_{L,i} \\ y_{L,i} \end{bmatrix} \to \tilde{p}_{L,i} = \begin{bmatrix} x_{L,i} \\ y_{L,i} \\ 1 \end{bmatrix} \text{ and } p^W_i = \begin{bmatrix} x^W_i \\ y^W_i \\ z^W_i \end{bmatrix} \to \tilde{p}^W_i = \begin{bmatrix} x^W_i \\ y^W_i \\ z^W_i \\ 1 \end{bmatrix}. \quad (4)$$

For normalization, the points are translated to their center of gravity then normalized to have an average coordinate length of 1.

$$\bar{p}_{L,i} = N^L T^L \tilde{p}_{L,i} = \begin{bmatrix} \sqrt{2}/\alpha^L & 0 & 0 \\ 0 & \sqrt{2}/\alpha^L & 0 \\ 0 & 0 & 1 \end{bmatrix} \begin{bmatrix} 1 & 0 & -\gamma_x^L \\ 0 & 1 & -\gamma_y^L \\ 0 & 0 & 1 \end{bmatrix} \tilde{p}_{L,i} \quad (5)$$

and $$\bar{p}_i^W = N^W T^W \tilde{p}_i^W \quad (6)$$

$$= \begin{bmatrix} \sqrt{3}/\alpha^W & 0 & 0 & 0 \\ 0 & \sqrt{3}/\alpha^W & 0 & 0 \\ 0 & 0 & \sqrt{3}/\alpha^W & 0 \\ 0 & 0 & 0 & 1 \end{bmatrix} \begin{bmatrix} 1 & 0 & 0 & -\gamma_x^W \\ 0 & 1 & 0 & -\gamma_y^W \\ 0 & 0 & 1 & -\gamma_z^W \\ 0 & 0 & 0 & 1 \end{bmatrix} \tilde{p}_i^W$$

where the gammas ($\gamma$) are the average coordinates of the point sets and the alphas ($\alpha$) are the $L_2$ norms (Euclidean lengths) of the translated vector from each set with the greatest length.

B. First Estimate of the Projection Matrix and Distortion Vector.

This is done separately for each of the two projection matrices, the left and the right. The left transform is used to describe the procedure as follows.

1. Find the 3×4 projection matrix, $\bar{P}_W^L$, that minimizes $(\bar{p}_{L,i} - \bar{P}_W^L \bar{p}_i^W)^2$ through direct linear transformation, where $\bar{p}_{L,i}$ and $\bar{p}_i^W$ are the normalized homogenized points from part A. The resultant projection matrix, $\bar{P}_W^L$, is normalized.

2. Denormalize the projection matrix as follows:

$$P_W^L = [N^L T^L]^{-1} \bar{P}_W^L N^W T^W. \quad (7)$$

3. Divide each element of the 3×4 denormalized $P_W^L$ by the square root of the sum of the squares of the first 3 elements of its third row.

4. Renormalize the result as follows:

$$\bar{P}_W^L = N^L T^L P_W^L [N^W T^W]^{-1}. \quad (8)$$

5. Decompose the normalized projection matrix (described in more detail below) as $$P_W^L \rightarrow \{K_L, R_W^L, t_W^L\} \quad (9)$$

6. Construct, $\beta$, the vector of 16 parameters, $$\beta_1 = f_x^L, \beta_2 = \sigma, \beta_3 = c_x^L, \beta_4 = f_y^L, \beta_5 = c_y^L,$$

$$\beta_6 = 1 \ \beta_{7-9} = r_W^L, \beta_{10-12} = t_W^L, \beta_{13-16} = \kappa_L. \quad (10)$$

Note that $\beta_{7-9}$ and $\beta_{10-12}$ in Eqn. (9) differ from those in (3).

7. Minimize the difference between the normalized, observed image coordinates and the world points pinhole projected then distorted. That is done by iterating the following procedure within a generic Levenberg-Marquardt optimization program. A generic Levenberg-Marquardt routine updates the parameter vector at each iteration.

a. Reconstruct the 3×3 camera matrix, $K_L$, the distortion vector $\kappa_L$, the rotation vector, $r_W^L$, and the translation vector, $t_W^L$, from the updated parameter vector.

b. Compute the 3×3 rotation matrix, $R_W^L$, from the rotation vector via the Rodrigues transform.

c. Pinhole project the world points through the rotation and translation matrix as follows:

$$p_{L,i}' = [R_W^L | t_W^L] p_i^W \quad (11)$$

d. Find the maximum length, m, of the pinhole projected point vectors. If m>1, divide all the pinhole projected coordinates by m.

e. Distort the result as follows:

$$r^2 = x^2 + y^2,$$

$$x^d = x(1 + \rho_1 r^2 + \rho_2 r^4) + 2\tau_1 xy + \tau_2(r^2 + 2x^2),$$

$$y^d = y(1 + \rho_1 r^2 + \rho_2 r^4) + \tau_1(r^2 + 2y^2) + 2\tau_2 xy, \quad (12)$$

f. where $(x, y) = p'_{L,i}$ are the pinhole projected coordinates, $(x^d, y^d) = p''_{L,i}$ are the distorted, projected coordinates, and $\rho_j$ and $\tau_j$, for $j = 1, 2$, are the radial and tangential distortion coefficients.

g. If m>1, multiply the distorted projected coordinates by m.

h. Premultiply $p''_{L,i}$ by camera matrix $K_L$, to get normalized, distorted, projected coordinates, $$\bar{p}_{L,i}'' = K_L p_{L,i}'' \quad (13)$$

i. Depending on the exact requirements of the Levenberg-Marquardt procedure, either return $$\delta_{L,i} = \bar{p}_{L,i} - \bar{p}_{L,i}'', \quad (14)$$

the difference between the normalized pixel coordinates and the normalized, distorted, projected coordinates, the square of $\delta_{L,i}$, or the normalized, distorted, projected coordinates themselves. Also return $f_x^L - f_y^L$, $\sigma^L$, and $\beta_6 - 1$, each multiplied by $10^5$ to enforce the soft constraints.

8. After the optimization algorithm converges, construct the 3×3 camera matrix, $K_L$, the distortion vector $\kappa_L$, the rotation vector, $r_W^L$, and the translation vector, $t_W^L$, from the updated parameter vector.

9. Construct the estimated projection matrix as $$P_W^L = [N^L T^L]^{-1} K_L [R_W^L | t_W^L] N^W T^W \quad (15)$$

10. Divide each element of $P_W^L$ by the square root of the sum of the squares of the first 3 elements of its third row.

11. Return $P_W^L$ and $\kappa_L$ as initial estimates of the parameters; return the normalization matrices, $N^L T^L$, and $N^W T^W$.

C. Normalize the Projection Matrices.

Normalize both the left and the right projection matrices using Eqn. (8) above.

D. Decompose the Normalized Projection Matrices.

Decompose the matrices as disclosed in Eqn. (9) above. This is done as follows for both the left and the right projection matrices:

1. Let M be the 3×3 matrix that is the first three columns of the projection matrix, $P_W^L$.

2. Use an re-transform to represent M as the product of an upper triangular matrix and a rotation matrix, $$M = KR, \quad (16)$$

subject to the constraint that elements on the main diagonal of K are nonnegative. That is let, $$S = \begin{bmatrix} \text{sgn}(K_{11}) & 0 & 0 \\ 0 & \text{sgn}(K_{22}) & 0 \\ 0 & 0 & \text{sgn}(K_{33}) \end{bmatrix}, \quad (17)$$

and replace $K \rightarrow KS$ and $R \rightarrow SR$. Then $K_L = KS$ and $R_W^L = SR$.

3. Let $q$ = the $4^{th}$ column of $P_W^L$. Compute the camera location in world coordinates and vice-versa as $$t_L^W = -M^{-1} q \text{ and } t_W^L = -R_W^L t_L^W \quad (18)$$

4. Normalize the camera matrix by dividing each of its elements by the element in row 3 column 3, $$K_L \leftarrow K_L / K_{L,33} \qquad (19)$$

E. Compute the Camera-to-World Rotation Matrices and Translation Vectors.

These are computed from the world-to-camera versions though inversion of the normalized components from Part D above.

$$R_L^W = [R_W^L]^T \text{ and } t_L^W = -R_L^W t_W^L. \qquad (20)$$

F. Compute the Rotation Vectors.

$r^W_L$ and $r^W_R$ are computed from the left and right rotation matrices using the Rodrigues transform.

G. Construct the Parameter Vector for the Levenberg-Marquardt Optimization.

A vector of 32 parameters, $\beta$, is constructed such that the first 16 are for the left camera $$\beta_1 = f_x^L, \beta_2 = \sigma, \beta_3 = c_x^L, \beta_4 = f_y^L, \beta_5 = c_y^L,$$

$$\beta_6 = 1 \ \beta_{7-9} = r_L^W, \beta_{10-12} = t_L^W, \beta_{13-16} = \kappa_L \qquad (21)$$

and the second 16 are similar but for the right camera.

H. Perform the Levenberg-Marquardt Optimization.

Minimize the difference between the observed world points, $\{p^W_i\}_{i=1,\ldots,n}$ and those created through stereoptic projection of the undistorted normalized image pixel coordinates. That is done by iterating the following procedure within a generic Levenberg-Marquardt optimization program. The steps are as follows:

1. Construct the updated left and right normalized camera matrices, rotation vectors, and distortion coefficients.
2. Construct the left and right rotation matrices from the rotation vectors using the Rodrigues transform.
3. Undistort the normalized left image pixel coordinates, $\bar{p}_{L,i}$, as follows:
   a. Find the maximum length, m, of $\bar{p}_{L,i}$. If m>1, divide all the $\bar{p}_{L,i}$ by m.
   b. Let $x_{L,i}$ and $y_{L,i}$ be the x-, and y-coordinates of $\bar{p}_{L,i}$.
   c. As a first estimate let $x^u_{L,i} = x_{L,i}$ and $y^u_{L,i} = y_{L,i}$.
   d. Repeat the following 5 steps 20 times for each of the pixels i=1, ..., n.

$$\text{(i) } r_i^2 = (x^u_{L,i})^2 + (y^u_{L,i})^2 \qquad (22)$$

$$\text{(ii) } r_i^4 = (r_i^2)^2$$

$$\text{(iii) } l = 1 + \rho_1 r_i^2 + \rho_2 r_i^4$$

$$\text{(iv) } x^u_{L,i} = \left(x_i - \frac{1}{l}(2\tau_1 x^u_{L,i} y^u_{L,i} + \tau_2(r_i^2 + 2(x^u_{L,i})^2))\right)$$

$$\text{(v) } y^u_{L,i} = \left(y_i - \frac{1}{l}(2\tau_2 x^u_{L,i} y^u_{L,i} + \tau_1(r_i^2 + 2(y^u_{L,i})^2))\right)$$

4. Do the same for the right image pixel coordinates, $\bar{p}_{R,i}$.
5. Then the undistorted normalized pixel coordinates are $$p^u_{L,i} = \begin{bmatrix} x^u_{L,i} \\ y^u_{L,i} \end{bmatrix} \qquad (23)$$

$$p^u_{R,i} = \begin{bmatrix} x^u_{R,i} \\ y^u_{R,i} \end{bmatrix}$$

6. Use point-wise stereo projection to compute an estimate of the normalized world points. That algorithm is as follows:

a. $p^W_{L,i} = R_L^W p^u_{L,i},$ \qquad (24)

b. $p^W_{R,i} = R_R^W p^u_{R,i},$ c. $p^2_{L,i} = (p^W_{L,i})^T p^W_{L,i},$ d. $p^2_{R,i} = (p^W_{R,i})^T p^W_{R,i},$ e. $p^L_{R,i} = (p^W_{L,i})^T p^W_{R,i},$ f. $k_i = (p^2_{L,i} p^2_{R,i} - p^L_{R,i} p^L_{R,i})^{-1},$ g. $A_i = k_i \begin{bmatrix} p^2_{R,i} & -p^L_{R,i} \\ p^L_{R,i} & -p^2_{L,i} \end{bmatrix},$ h. $b = t^W_R - t^W_L,$ i. $b_{L,i} = b^T p^W_{L,i},$ j. $b_{R,i} = b^T p^W_{R,i},$ k. $\begin{bmatrix} \lambda_{L,i} \\ \lambda_{R,i} \end{bmatrix} = A_i \begin{bmatrix} b_{L,i} \\ b_{R,i} \end{bmatrix},$ l. $\tilde{p}^W_{L,i} = \lambda_{L,i} p^W_{L,i} + t^W_L,$ m. $\tilde{p}^W_{R,i} = \lambda_{R,i} p^W_{R,i} + t^W_R,$ n. $\tilde{p}^W_i = \frac{1}{2}(\tilde{p}^W_{L,i} + \tilde{p}^W_{R,i}).$ Then $\tilde{p}^W_i$ is the estimated world point.

7. Depending on the exact requirements of the Levenberg-Marquardt procedure, either return $$\delta_{w,i} = p^W_i - \tilde{p}^W_i, \qquad (14)$$

the difference between the normalized, observed world coordinates and the estimated, normalized world coordinates, the square of $\delta_{W,i}$, or the normalized world coordinates themselves. Also return $f^L_x - f^L_y$, $\sigma^L$, and $\beta_6 - 1$, $f^R_x - f^R_y$, $\sigma^R$, and $\beta_{22} - 1$, each multiplied by $10^5$ to enforce the soft constraints.

I. Reconstruct the Projection Matrices and Retrieve the Distortion Coefficients.

Construct the left and right estimated projection matrices from the estimated parameters. Recall that the Ks, Rs, and ts were computed using the normalized points $$P_W^L = [N^L T^L]^{-1} K_L [R_W^L | t_W^L] N^W T^W$$

$$P_W^R = [N^R T^R]^{-1} K_L [R_W^R | t_W^R] N^W T^W \qquad (15)$$

Divide each element of $P_W^L$ by the square root of the sum of the squares of the first 3 elements of its third row; similarly for $P_W^R$. The right and left optimum distortion coefficients, $\kappa_L$ and $\kappa_R$, are copied from the estimated parameters as indicated.

J. Decompose the Projection into their Constituents.

This is done exactly as in Part D as described above.

The results of the above procedure are optimum right and left camera matrices, rotation matrices, translation vectors, and distortion coefficients.

In one exemplary embodiment, the above steps are carried out by a computer program operating on a computing device with a processor or microprocessor. The program provides tools for a user to assist in the calibration of the two cameras. Several of these features require the use of a checkerboard fiducial (or similar fiducial with a visible pattern) to be visible in both the left and right camera images.

Figure 2A:
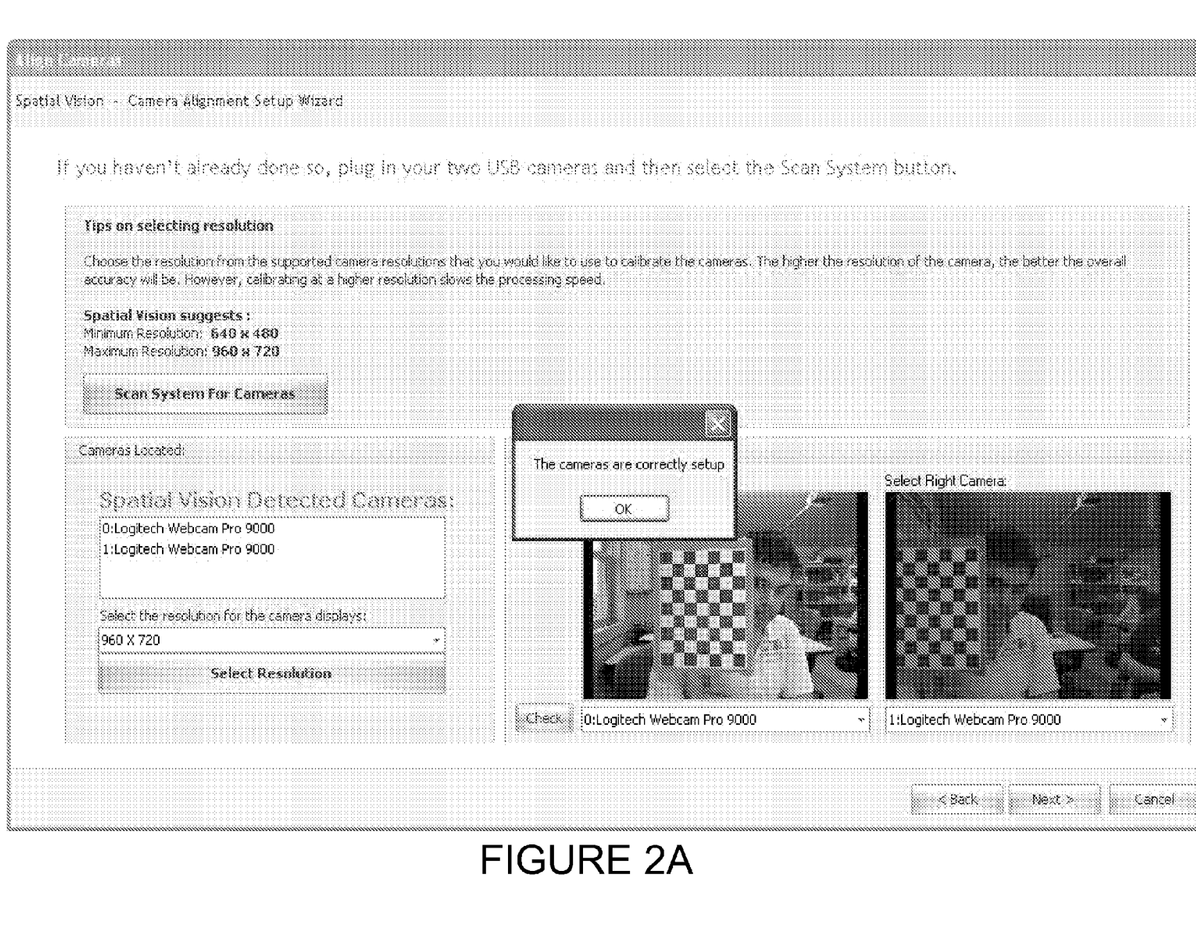
FIGS. 2A and 2B show two screenshots from a computer program in accordance with an exemplary embodiment of the present invention.
Figure 2B:
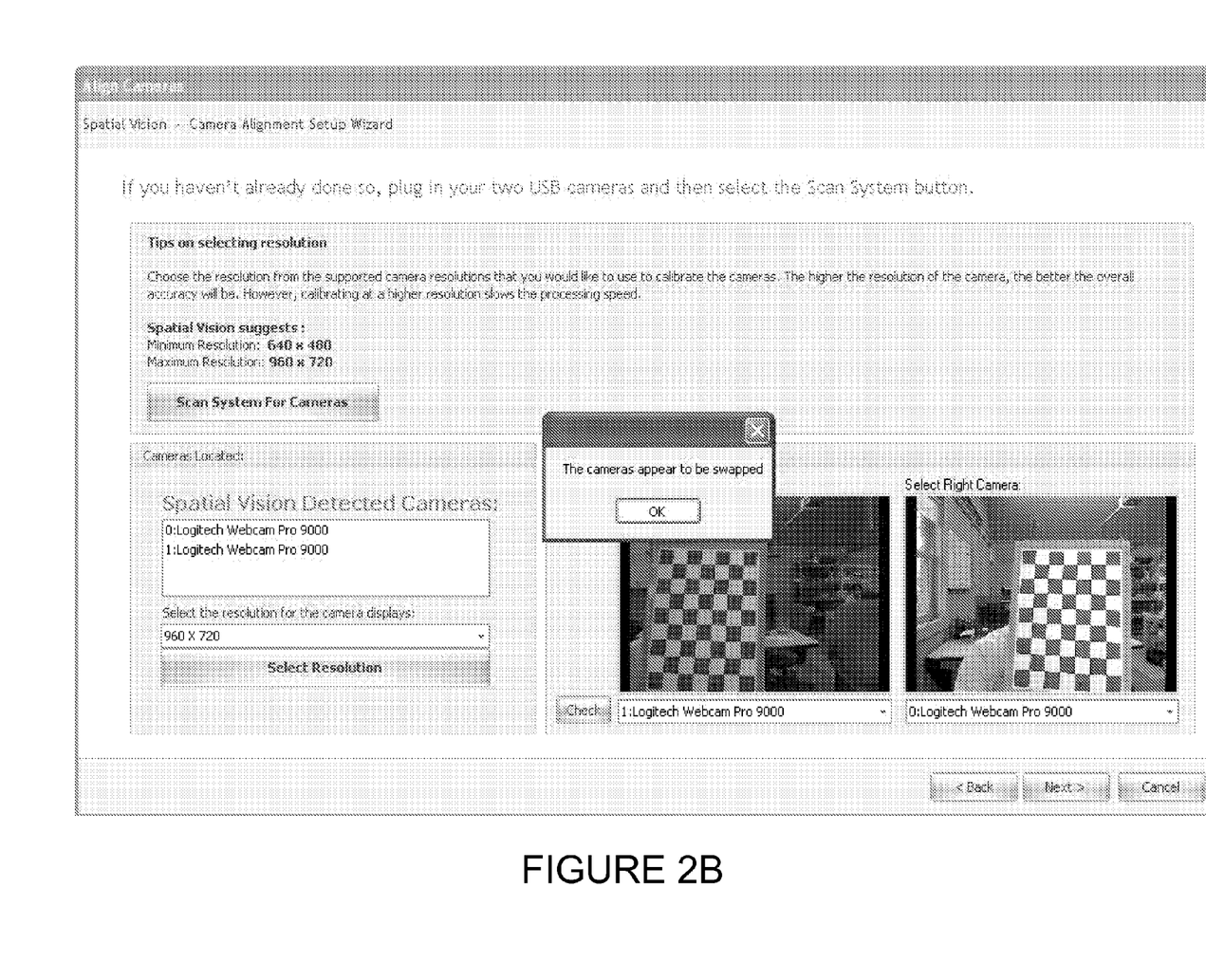

One feature is camera swap detection, which determines whether the left and right camera have been accidentally swapped by the user. In cases where the cameras are swapped, the calibration results will be highly inaccurate. This feature requires the fiducial to be held or positioned so that it is visible in both images. The program compares the two images, and alerts the user if the cameras are swapped, or notifies the user if the cameras are properly set up (see FIGS. 2A and 2B).

Figure 3:
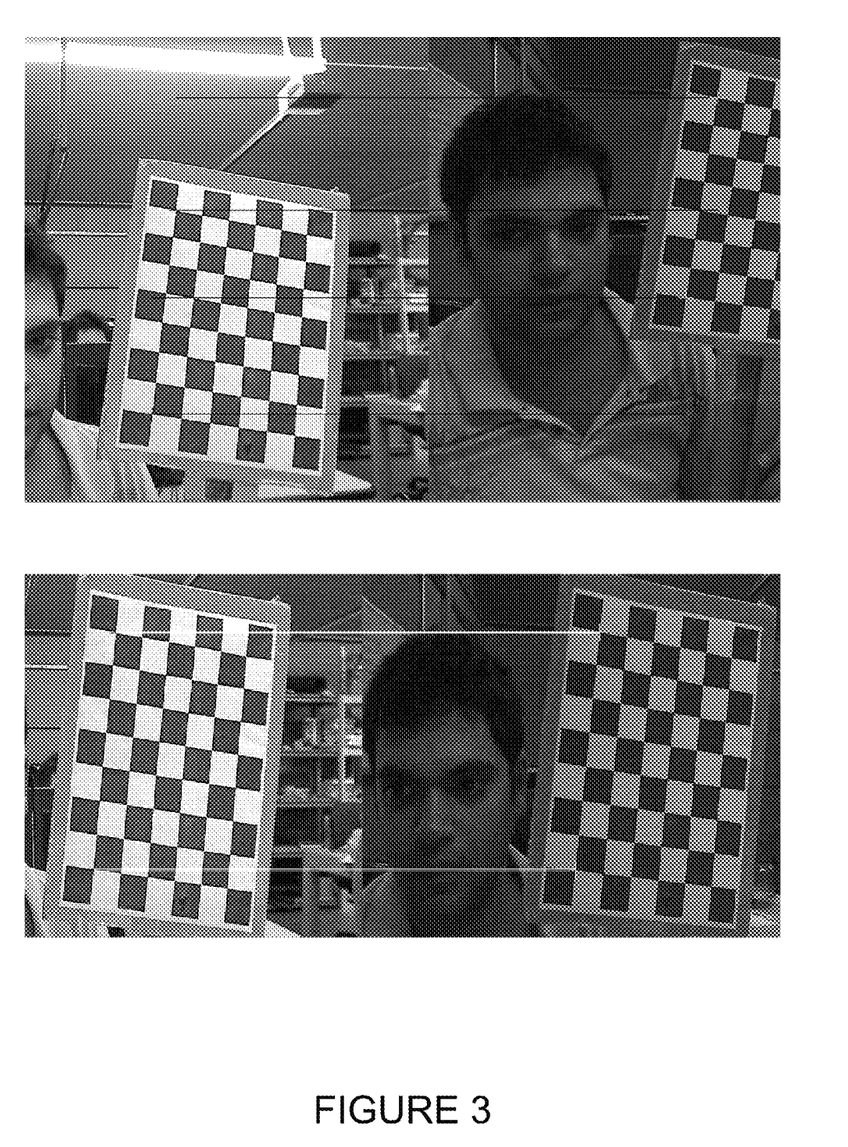
FIG. 3 shows a screenshot of the use of a fiducial for horizontal alignment of dual cameras.

Another feature is the camera alignment feature. Once the cameras are set up correctly, it is important to get a good horizontal alignment of the cameras. The program uses the checkerboard fiducial (or other fiducial, as described above) to allow the user to align the cameras in an intuitive manner. The program displays images from both the left and right cameras on a single image, and draws horizontal lines across the left top and left bottom edge corner of the fiducial, as shown in FIG. 3. The color of the lines change from black (i.e., bad alignment) to shades of gray to white (i.e., good alignment), depending on how close the alignment is.

Figure 4:
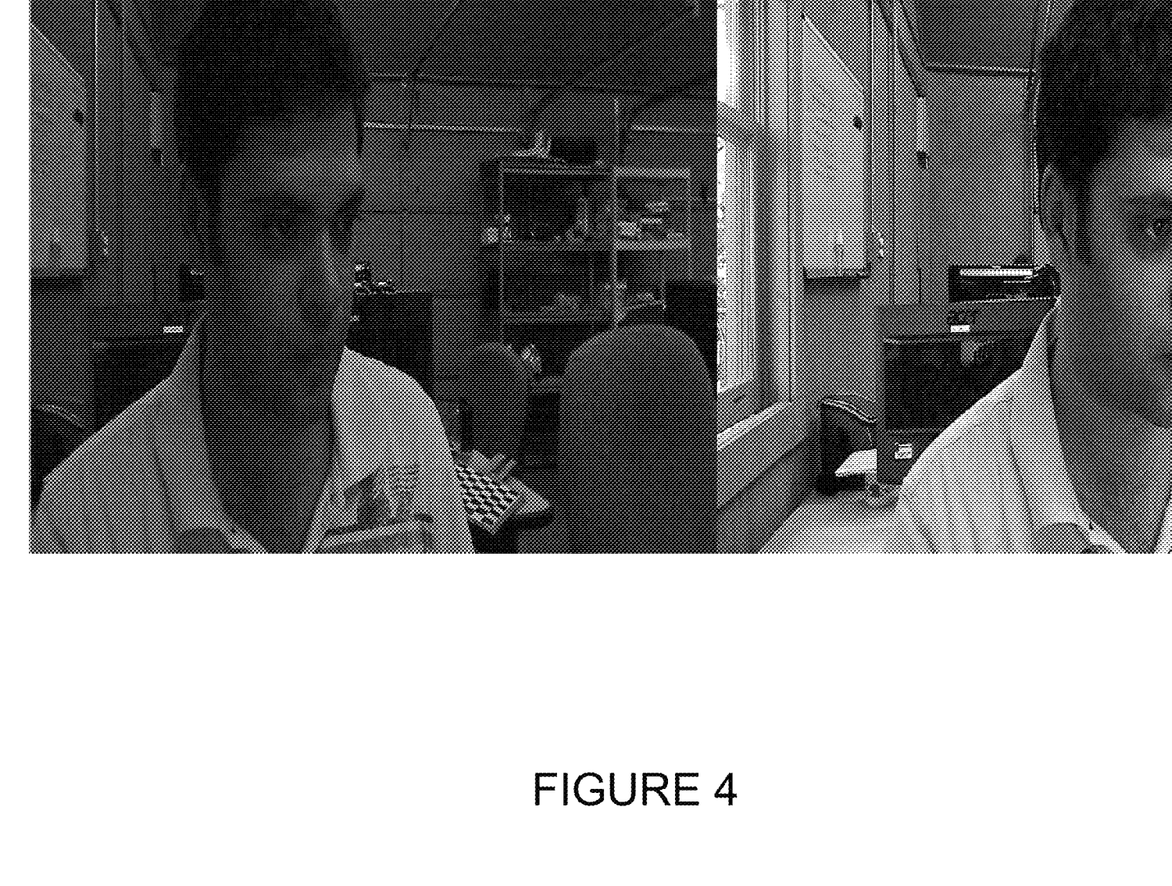
FIG. 4 shows a screenshot of a user alert mechanism.

Yet another feature is the use of a change in color spectrum (or shading, for a gray-scale image) in an image to signify undesired behavior from the user. As seen in FIG. 4, a blue hue is added to the image when an undesired behavior is encountered (such as a missing checkerboard fiducial being completely visible in the image when one is expected). This is more intuitive than using a standard message box or alert pop-up.

It should be understood that the embodiments and examples described herein have been chosen and described in order to best illustrate the principles, methods, and processes of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for automatic calibration of a pair of cameras to a robot arm, comprising:
 a computing device with a microprocessor, wherein the microprocessor is programmed to calibrate the cameras with respect to the robot arm with a light source attached to one end by:
 moving the robot arm to a position where the light source on the robot arm is visible to both cameras;
 taking digital pictures with both cameras when the light source is on, the digital pictures including the end of the robot arm and the light source, and transferring the pictures to the computing device;
 without moving the robot arm, turning the light source off and taking digital pictures with both cameras, the digital pictures including the end of the robot arm and the light source, and transferring the pictures to the computing device;
 subtracting the pictures with the light source off from the pictures with the light source on to get an image of the light produced by the light source alone; and
 repeating the above steps for a plurality of different positions of the robot arm.

2. The system of claim 1, further wherein the microprocessor is programmed to determine a plurality of point triples for each position, each point triple comprising the world position of the light using the coordinate system of the robot arm, the pixel position of the light in the left picture, and the pixel position of the light in the right picture.

3. A system for automatic calibration of a pair of cameras to a robot arm, comprising:
 a computing device with a microprocessor, wherein the microprocessor is programmed to calibrate the cameras with respect to the robot arm with a light attached to one end by:
 moving the robot arm to a position where the light is visible to both cameras:
 taking digital pictures with both cameras when the light is on, and transferring the pictures to the computing device:
 without moving the robot arm, turning the light off and taking digital pictures with both cameras, and transferring the pictures to the computing device:
 subtracting the pictures with the light off from the pictures with the light on to get an image of the light alone: and
 repeating the above steps for a plurality of different positions of the robot arm;
 further wherein the microprocessor is programmed to determine a plurality of point triples for each position, each point triple comprising the world position of the light using the coordinate system of the robot arm, the pixel position of the light in the digital picture from one camera, and the pixel position of the light in the corresponding digital picture from the other camper; and
 further wherein the microprocessor is programmed to apply a procedure for parameter optimization to each of the cameras, wherein the procedure for parameter optimization comprises the steps of:
 homogenizing and normalizing the point triples;
 generating projection transforms by estimating the individual camera parameters by finding those parameters that minimize the geometric distance between the image pixel locations and the forward projected world position point;
 normalizing the projection transforms;
 decomposing the projection transforms into their constituents, $K_L$, $R^L{}_W$, and $t^L w$;
 inverting $R^L{}_W$ and $t^L w$ to create $R^W{}_L$ and $t^W{}_L$;
 converting rotation matrix $R^W{}_L$ to a 3-element rotation vector, $r^W{}_L$;
 constructing a vector of 32 parameters, $\beta$, with 16 parameters for each camera;
 running an optimization routine to minimize the geometric difference between the normalized world points and the stereo projections of the normalized undistorted image pixel locations;
 reconstructing the left and right projection matrices;
 retrieving the left and right distortion coefficients; and
 decomposing the projection matrices into their constituent matrices and vectors.

4. The system of claim 3, wherein the positions are selected to cover the contiguous region of space that can be reached by the end of the robot arm.

5. The system of claim 3, further wherein the microprocessor is programmed to find the pixel positions of the light in the digital pictures.

6. A system for calibrating two cameras used for stereo vision, comprising:
 a computing device with a microprocessor and a video display screen, wherein the computing device receives simultaneous image input from the two cameras and displays the image input as adjacent right and left images on the video display screen; and
 a fiducial with a visible pattern, wherein the fiducial is held in a position in front of the cameras so that it is visible to both cameras and is shown in the images on the video display screen;

wherein the cameras comprise adjacent right and left cameras;

further wherein the microprocessor compares the two images to determine whether the right image is received from the right camera, and the left image is received from the left camera; and further wherein the microprocessor causes one or more horizontal lines to be displayed on the video display screen across the right and left images to assist in horizontal alignment of the two cameras, wherein the alignment is based on the comparative distance of said horizontal line or lines to a selected fiducial feature in each image.

7. The system of claim 6, wherein horizontal lines are drawn across the corresponding left top and left bottom edge corners of the fiducial images.

8. The system of claim 6, wherein the color of the lines changes based on how close the alignment is between the two fiducial images.

9. The system of claim 8, wherein the alignment of one or both of the cameras is adjusted based on the horizontal lines.

10. The system of claim 6, further wherein the microprocessor compares the two fiducial images, and determines if the left and right images properly correspond to the left and right cameras.

11. The system of claim 10, further wherein an alert message is displayed on the video screen if the left and right images do not properly correspond to the left and right cameras.

12. The system of claim 6, wherein a user is alerted when an undesired behavior or condition is encountered or detected.

13. The system of claim 12, wherein the alert mechanism is a change in shading or color spectrum on the images on the video display.

14. The system of claim 12, wherein the undesired behavior or condition is a fiducial not being completely visible in an image.

* * * * *